US007706963B2

(12) United States Patent
Parikh et al.

(10) Patent No.: US 7,706,963 B2
(45) Date of Patent: Apr. 27, 2010

(54) SYSTEM FOR AND METHOD OF UPDATING TRAFFIC DATA USING PROBE VEHICLES HAVING EXTERIOR SENSORS

(75) Inventors: Jayendra S. Parikh, Bloomfield Hills, MI (US); Hariharan Krishnan, Troy, MI (US); Martin A. Ferman, Huntington Woods, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 168 days.

(21) Appl. No.: 11/262,473

(22) Filed: Oct. 28, 2005

(65) Prior Publication Data

US 2007/0100537 A1 May 3, 2007

(51) Int. Cl.
*G08G 1/00* (2006.01)
*G08G 1/123* (2006.01)
*G01C 21/00* (2006.01)

(52) U.S. Cl. ........................ 701/117; 701/116; 701/118; 701/119; 701/207; 701/208; 701/300; 701/301; 701/302; 340/901; 340/902; 340/903; 340/904; 340/905; 340/988; 340/989; 340/991; 340/992; 340/993; 340/995.1; 340/995.13; 340/995.28; 342/357.08; 342/454; 342/456; 342/461; 342/463

(58) Field of Classification Search ......... 701/116–119, 701/207, 208, 300–302; 340/901–905, 907, 340/988–993, 995.1–995.13, 995.28; 342/357.08, 342/454–458, 461, 463
See application file for complete search history.

(56) References Cited

U.S. PATENT DOCUMENTS

| | | | | | |
|---|---|---|---|---|---|
| 5,926,117 | A | * | 7/1999 | Gunji et al. | 340/988 |
| 5,983,161 | A | * | 11/1999 | Lemelson et al. | 701/301 |
| 6,150,961 | A | * | 11/2000 | Alewine et al. | 340/995.1 |
| 6,268,804 | B1 | * | 7/2001 | Janky et al. | 340/903 |
| 6,433,704 | B1 | * | 8/2002 | Fushiki et al. | 340/905 |
| 6,615,137 | B2 | * | 9/2003 | Lutter et al. | 701/301 |
| 6,650,252 | B2 | * | 11/2003 | Miller, Jr. | 340/989 |
| 6,741,932 | B1 | * | 5/2004 | Groth et al. | 701/210 |
| 6,813,247 | B1 | * | 11/2004 | Hassan | 370/252 |
| 6,965,829 | B2 | * | 11/2005 | Yamadaji et al. | 701/301 |
| 6,990,407 | B1 | * | 1/2006 | Mbekeani et al. | 701/117 |
| 2002/0193938 | A1 | * | 12/2002 | DeKock et al. | 701/117 |
| 2003/0069683 | A1 | * | 4/2003 | Lapidot et al. | 701/117 |
| 2004/0167710 | A1 | * | 8/2004 | Fushiki et al. | 701/208 |
| 2004/0230370 | A1 | * | 11/2004 | Tzamaloukas | 701/200 |
| 2005/0137756 | A1 | * | 6/2005 | Takahashi | 701/1 |
| 2005/0222764 | A1 | * | 10/2005 | Uyeki et al. | 701/210 |
| 2007/0112503 | A1 | * | 5/2007 | Johnson et al. | 701/117 |
| 2007/0213922 | A1 | * | 9/2007 | Van Buer et al. | 701/117 |

FOREIGN PATENT DOCUMENTS

WO WO-0135371 * 5/2001

* cited by examiner

*Primary Examiner*—Jack W. Keith
*Assistant Examiner*—Chuong P Nguyen

(57) ABSTRACT

A probe-vehicle traffic information system for and method of gathering traffic data utilizing a host probe vehicle having onboard exterior sensors. The host vehicle is configured to detect at least one condition from at least one traveling target vehicle, aggregate and process the condition data, and report only the processed data to a traffic information center, so as to reduce the number of simultaneous communication channels typically required to report condition data from a plurality of probe vehicles.

15 Claims, 4 Drawing Sheets

SYSTEM FOR AND METHOD OF UPDATING TRAFFIC DATA USING PROBE VEHICLES HAVING EXTERIOR SENSORS

TECHNICAL FIELD

The present invention relates to systems for and methods of collecting traffic data using probe vehicles, and more particularly, to a traffic information system configured to collect traffic data using probe vehicles having onboard exterior sensors.

BACKGROUND OF THE INVENTION

Traffic information and management systems have been developed, wherein vehicles are used as probes for measuring traffic conditions in real-time. In these configurations, individual vehicles provide "floating car data," such as, for example, the current time, speed, position, and heading of the probe vehicle, which can then be used to estimate travel time or traffic speed. These data are typically used as an online indicator of road network status, as a basis for detecting incidents, or as input for a dynamic route guidance system.

These systems generally include a traffic information center (TIC); a plurality of probe vehicles; technology for determining the location of each vehicle, such as, for example, the Global Positioning System (GPS), a system using cellular telephones, or a system using radio-frequency identification (RFID); and wireless communication means for allowing bilateral communication between the probe vehicles and the TIC. The TIC (or receiving center) receives and processes the data generated by the probe vehicles to determine a desired outcome or condition, and returns the result to a plurality of receiving vehicles that may further include partially implemented non-probe vehicles.

Conventional probe-vehicle systems, however, present various scalability concerns resulting from independent vehicle interaction with the center. Often, an exceedingly large number of probe vehicles redundantly communicate with the receiving center in order to provide a relatively small amount of useful data. For example, where a plurality of probe vehicles are located within a traffic jam, each vehicle may independently communicate with the center to redundantly alert the system to the presence of the traffic jam. Similarly, independent interaction can result in the omission of traffic conditions that do not involve probe vehicles; as is the case, for example, where the probe vehicles are spaced from the traffic jam and fail to communicate its presence to the center.

Another scalability concern is presented by the exceedingly large number of communication channels, one for each independently operating probe vehicle, that is needed to accommodate the frequent data communications. Finally, the large volume of incoming data that must be processed in real-time requires that there be substantial and constantly increasing capacity at the center.

These concerns, among others, result in the need for a more efficiently operating traffic information system that reduces communication volume, and thereby, reduces the required capacity of the system.

SUMMARY OF THE INVENTION

Responsive to these and other concerns presented by conventional probe vehicle systems, the present invention concerns an improved traffic information system that utilizes at least one host probe vehicle configured to sense and aggregate a plurality of remote target vehicle condition values, and transmit a single cooperatively determined value to a traffic information center. Among other things, the system is useful for reducing the number of simultaneous communication channels required to report the same information to the receiving center using a plurality of independently communicating probe vehicles. The system is further useful for reducing the amount of data which must be processed in real-time at the center. Finally, the transmission of an aggregate value of a condition instead of a single probe vehicle value, further results in increased privacy.

A first aspect of the invention presents a traffic information system adapted for use by a probe device spaced from at least one remotely traveling vehicle, and for updating at least one traffic condition and transmitting the traffic condition to at least one receiving entity. The system includes a traffic information center configured to store a first value of the traffic condition, and at least one probe device communicatively coupled to the center. The probe device includes at least one exterior sensor operable to detect a first remote vehicle condition, and is configured to determine a probed value of the traffic condition. The probed value is determined in part by the detected remote vehicle condition. The center is further configured to modify the first value of the traffic condition upon receipt of the probed value from said at least one probe device, and transmit the modified first value to said at least one receiving vehicle.

A second aspect of the invention further includes a predetermined minimum detected vehicle threshold, wherein the probe device is further configured to transmit the probed value to the center only when the number of detected remote vehicles is at least equal to the threshold.

Thus, it will be appreciated and understood that the system and method of the present invention provide a number of improvements and advantages over the prior art, including for example, reducing the number of simultaneous communication channels required to report probe vehicle data to the receiving center and reducing the amount of such data which must be processed in real-time at the receiving center.

These and other features of the present invention are discussed in greater detail in the section below titled DESCRIPTION OF THE PREFERRED EMBODIMENT(S).

BRIEF DESCRIPTION OF THE DRAWINGS

Preferred embodiments of the invention are described in detail below with reference to the attached drawing figures, wherein.

DESCRIPTION OF THE PREFERRED EMBODIMENT(S)

As described and illustrated herein, the present invention concerns an improved traffic information system 10 adapted for use by an automotive vehicle 12 traveling upon a thoroughfare or link. However, it is within the ambit of this invention to utilize the novel aspects and features in other suitable traffic information systems, wherein useful information can be derived from surrounding traffic, such as air traffic control or nautical navigation systems. The novel aspects and function of the invention are preferably adapted for electronic execution by a microcontroller and, therefore, may be embodied within one or more modules of computer program code.

Figure 1:
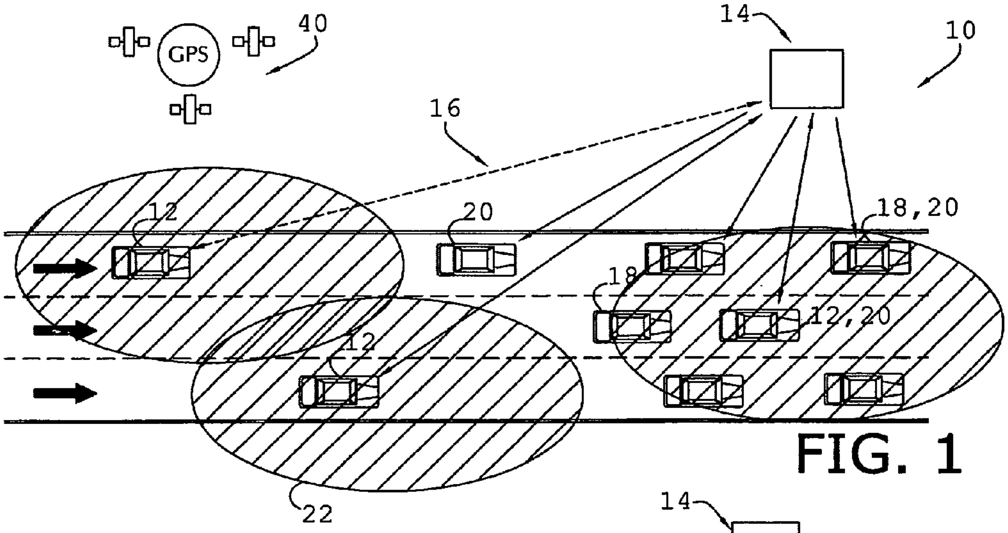
FIG. 1 is a plan view of a traffic information system in accordance with a preferred embodiment of the invention, particularly illustrating a plurality of probe vehicles and non-probe vehicles traveling upon a link, a GPS system, and a traffic information center communicatively coupled to a portion of the vehicles.

As shown in FIG. 1, the system 10 generally includes at least one host vehicle 12 or otherwise probe device, a traffic information center (TIC) 14, communication means 16 for allowing bilateral communication of traffic data therebetween, and at least one remotely traveling vehicle (i.e. target vehicle) 18 spaced from the host vehicle 12. Once the center 14 receives the uniquely determined probed data from the probe vehicle 12, it is configured to modify stored traffic data, and transmit the newly modified data to at least one receiving vehicle (or otherwise entity) 20, which may include the probe and/or target vehicles 12,18.

Figure 2:
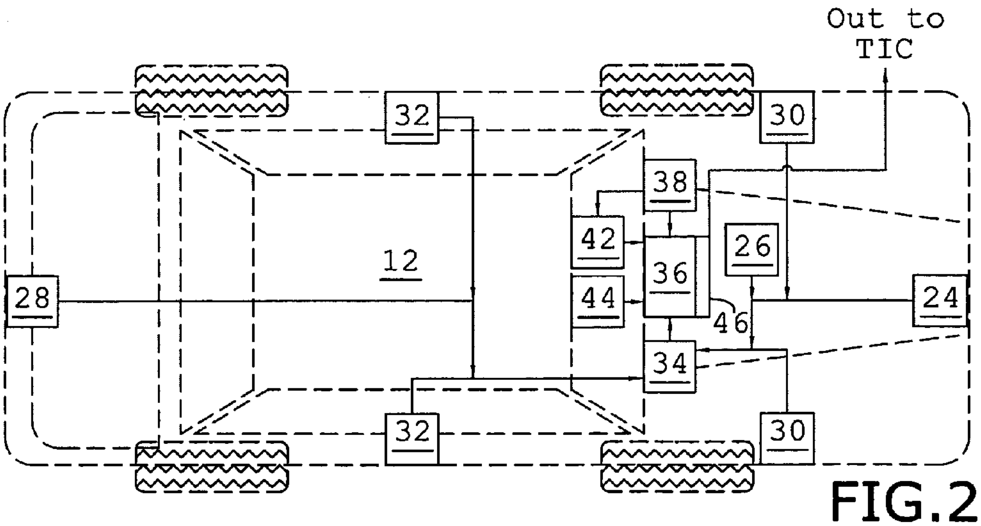
FIG. 2 is a plan view of a probe vehicle in accordance with a preferred embodiment of the present invention.
Figure 3:
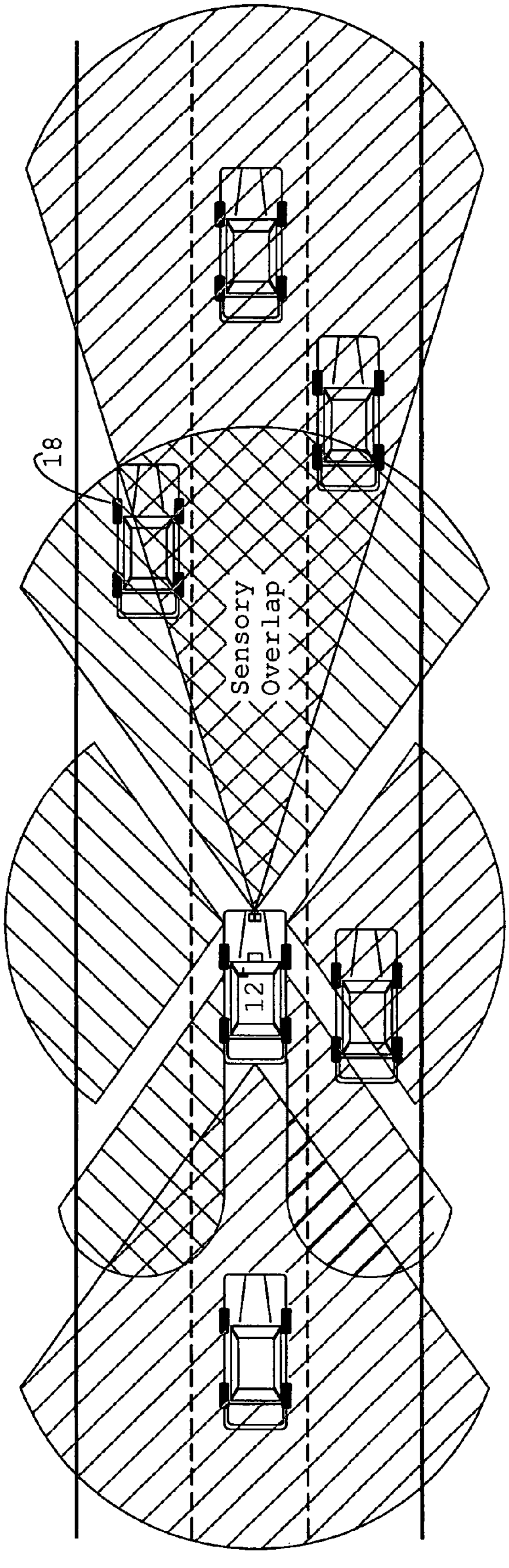
FIG. 3 is a plan view of the vehicle shown in FIG. 2 traveling upon a thoroughfare, particularly illustrating sensory overlap.

The probe vehicle 12 is, more particularly, configured to collect traffic data from a zone 22 immediately adjacent the exterior of the vehicle 12. The probe vehicle 12 includes at least one onboard surround-sensing (i.e. exterior) sensor operable to detect at least one condition of each target vehicle 18 located within the zone 22. More preferably, a plurality of medium, long and short-range sensors are oriented and positioned about the vehicle 12, so as to cooperatively provide 360° of detection capabilities and a zone 22 that generally circumscribes the exterior of the vehicle 12. For example, as shown in FIGS. 2 and 3, the probe vehicle 12 may include a forward long range (e.g. 150 m) scanning sensor 24, at least one forward medium range (e.g. 15 m) sensor 26, at least one rearward medium range sensor 28, left and right short (e.g. 6 m) or medium range side view sensors 30, and left and right short range blind-spot sensors 32. More preferably, the medium range forward sensor system 26 also includes lane tracking, object ID, and night vision capabilities. The vehicle 12 may further include left and right long range blind-spot (or Side/Rear Lane Change Assist) sensors (not shown), and a rearward vision system (also not shown) to expand the zone 22 and increase redundancy.

With respect to land vehicles, it is appreciated that these sensors may include charged-coupled device (CCD) or complementary metal oxide semi-conductor (CMOS) video image sensors, long and medium range radar and lidar sensors, and ultrasonic sensors. It is appreciated that these sensors may provide dual functionality in conjunction with an active safety system, such as a Forward Collision Warning, Adaptive Cruise Control, or Lane Change Merge application. As such, the preferred system 10 is further adapted for use with and to be implemented by a vehicle having an existing active safety system.

It is also appreciated by those ordinarily skilled in the art that the characteristics of these sensors are complementary, in that some are more reliable in estimating certain parameters than others. In other words, the sensors have different operating ranges and angular coverages, and are capable of estimating different parameters within their operating range. For example, radar sensors can usually estimate range, range rate and azimuth location of an object, but is not normally robust in estimating the extent of a detected object. A camera with vision processor is more robust in estimating the shape and azimuth position of the object, but is less efficient at estimating the range and range rate of the object. Scanning type Lidars perform efficiently and accurately with respect to estimating range, and azimuth position, but cannot estimate range rate, and is therefore not accurate with respect to new object acquisition/recognition. Finally, ultrasonic sensors are capable of estimating range but are generally incapable of estimating or computing range rate and azimuth position. Further, it is appreciated that the performance of each sensor technology is impacted by differing environmental conditions. Thus, as further shown in FIG. 3, the sensors 24-32 are preferably configured to result in redundant sensory overlap.

In a preferred embodiment, the sensors 24-32, their respective sensor processors 34 (shown singularly in FIG. 2), and the interconnection between the sensors, sensor processors, and a controller 36 are cooperatively configured to collect data at 10 Hz from up to fifteen target vehicles 18. The sensors 24-32, data processor 34 and controller 36 are configured, either singularly or in combination, to gather or otherwise determine target vehicle traffic data, such as for example, the time, speed, location (e.g., latitude and longitude), range from the probe vehicle 12, range rate of change, azimuth angle, azimuth angle rate of change, or acceleration/deceleration rate.

The preferred controller 36 is housed within the host probe vehicle 12, but may also be located at a remote location (not shown). In this regard, the controller 36 is electrically coupled to the sensor processors 34, but may also be wirelessly coupled through RF, LAN, Infrared or other conventional wireless technology.

At the controller 36, the target vehicle data and probe vehicle data are aggregated and processed, prior to reporting to the center 14. More particularly, once sensory data are collected and the range, range rate, speed and azimuth angle (i.e. heading) of each tracked target vehicle 18 are determined, the controller 36 is further configured to determine a probed value of a desired condition, based on the probe vehicle and target vehicles values of the condition. For example, the controller 36 may be configured to determine the average speed of the target and probe vehicles 12,18, track this average over a period as the probe vehicle 12 travels upon the link, and transmit the average speed to the center 14, so as to essentially convert each target vehicle 18 into a probe vehicle.

More preferably, the controller 36 is further configured to categorize the target vehicles into lanes of remote vehicles 18 having generally congruent headings, and transmit lane specific data, such as average lane speed. Conventional methods of triangulation, and other suitable means can be utilized by those ordinarily skilled in the art to determine remote vehicle locations and headings. To that end, the preferred probe vehicle 12 further includes a locator device 38 configured to determine the location of at least the probe vehicle 12 upon a three-coordinate system. The preferred controller 36 may be further configured to consider the remote vehicle condition only when the remote vehicle condition exceeds a predetermined remote vehicle condition threshold. For example, so as to avoid consideration of stationary road-side objects, the controller 36 may be configured to consider a remote vehicle only if its absolute speed exceeds 5 mph.

As shown in FIGS. 1 and 2, a preferred embodiment of the locator device 38 includes a receiver operable for use with a Global Positioning System (GPS) 40. In this configuration, the locator device 38 may be communicatively coupled to a map database 42 comprising a plurality of map records, wherein each record presents a plurality of links, so as to pinpoint the location of the probe vehicle 12 upon a map. Alternatively, the locator device 38 may include a system using cellular telephones, or radio-frequency identification (RFID).

The preferred probe vehicle 12 further includes at least one intra-vehicle sensor 44 operable to detect at least one probe vehicle condition, such as the probe vehicle speed, acceleration rate, lateral acceleration rate, or yaw rate. For example, a wheel speed or engine rpm sensor may be utilized.

Figure 1A:
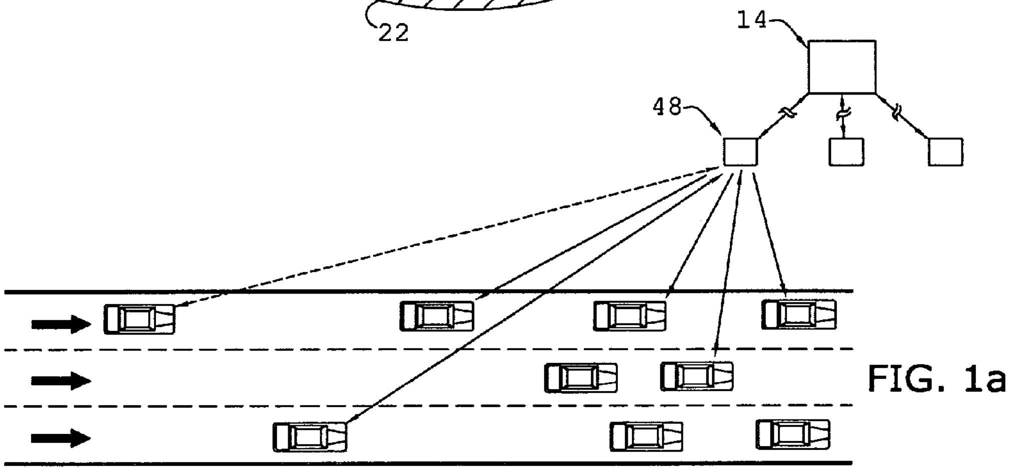
FIG. 1*a* is an alternate plan view of the system shown in FIG. 1, particularly illustrating the addition of at least one intermediary probe station or device.

Lastly, the probe vehicle 12 includes a communication processor 46 that enables communication with the center 14. The communication processor 46 is provided with a predefined message protocol for accomplishing these and other functions relating to operation of the present invention. Implementation of the data processor 34 and communication processor 46, and particularly the message protocol, can involve substantially conventional techniques and is therefore within the ability of one with ordinary skill in the art without requiring undue experimentation. Suitable transmission technology for this purpose includes cellular phone transmissions, FM/XM frequencies, and local and national wireless networks, such as the Internet. Where at least one intermediary amplification or repetitive device (or station) 48 is incorporated as shown in FIG. 1*a*, additional shorter range technologies may be utilized. For example, a Dedicated Short Range Communication (DSRC) system may be used.

Figure 4:
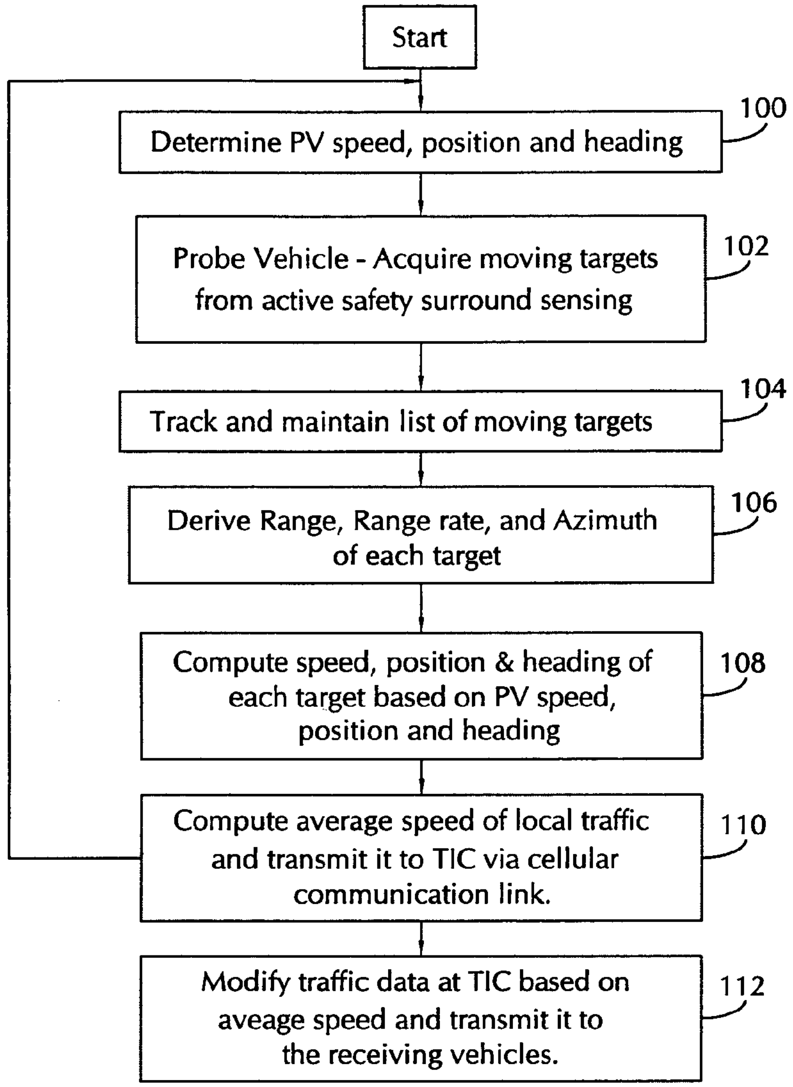
FIG. 4 is a flow diagram of a preferred method of performing the present invention.

Thus, as shown in FIG. 4, a preferred method of transmitting updated traffic data to at least one receiving vehicle or entity 20 is presented, and begins at a step 100, wherein a locator device 38 and intra-vehicle sensor 42 cooperatively determine the speed, position, and heading of a probe vehicle 12. At a step 102, the probe vehicle 12 identifies at least one remote traveling target vehicle 18 within its zone of detection. At a step 104, the target vehicles 18 are tracked over a period, and at step 106 the range, range rate, and azimuth angle for each target vehicle are determined relative to the probe vehicle 12. At a step 108, the absolute speed, position, and heading of each target vehicle 18 are determined based on the probe vehicle speed, position, and heading. Next, at a step 110, the averaged speed of local traffic, i.e. probed value, is computed and transmitted to a traffic information center 14. Finally, the center 14 utilizes the probed value at a step 112 to generate a modified value of a desired traffic condition, such as travel time en route, and continuously, periodically or upon request relays this modified data to the receiving vehicle(s) 20. The center 14 maintains communication with the probe vehicle 12, so as to provide constantly updated feedback, and returns to step 100, until the system 10 is deactivated.

Figure 4A:
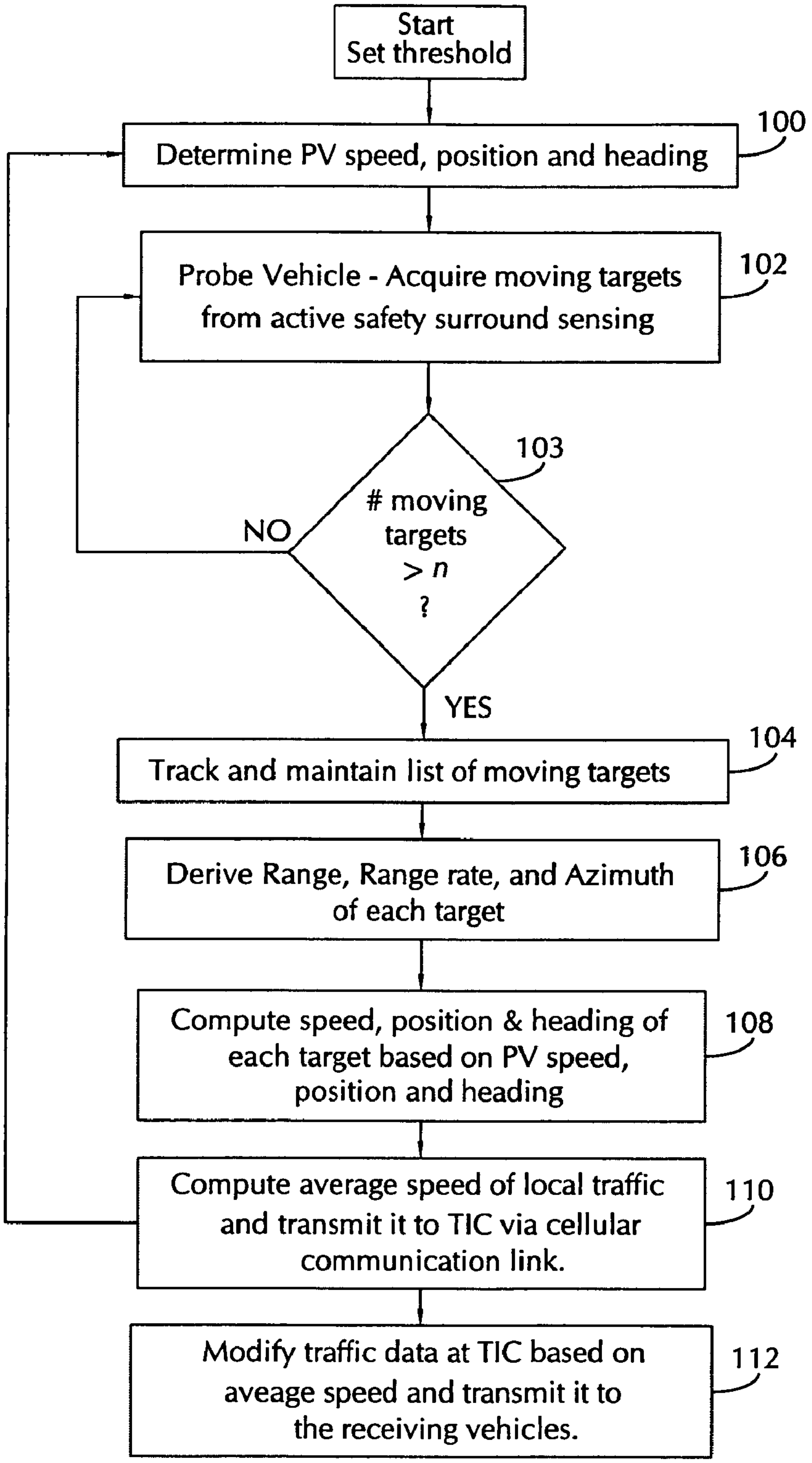
FIG. 4*a* is a flow diagram of a second preferred method of performing the present invention, further including a minimum detected targets threshold.

More preferably, so as to minimize the probability of error caused by noncongruency of target vehicle engagement from one probe vehicle to another, the method, more preferably, includes an intermediate step 103, wherein probe vehicles that do not engage a minimum number of target vehicles are eliminated from consideration. More particularly, as shown in FIG. 4*a*, the number of target vehicles detected by a probe vehicle 12, n, is compared to a predetermined integer threshold (i.e. 2, 5, 10, etc.). If n is less than the threshold the method returns to step 102, and continues to monitor the number of target vehicles detected. Otherwise, if n is greater than the threshold, the method precedes to step 104 as previously described. The threshold is preferably adjustable after implementation to present a user-specified system, as it is appreciated that the number of engaged target vehicles may vary depending, for example, upon the remoteness of the link.

Figure 5:
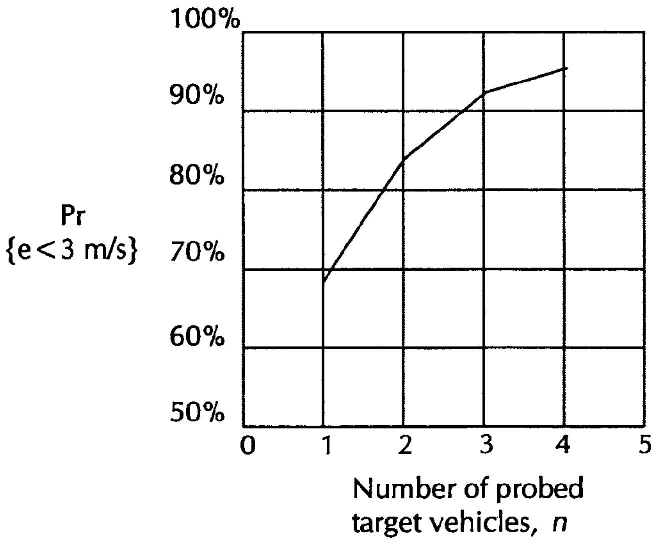
FIG. 5 is a chart comparison of the number of tracked vehicles versus the probability that the returned probed value will be within 3 m/s of the actual average link speed.

It is also appreciated that n is inversely proportional to the probability of error in determining the actual average link speed. In an exemplary sampling, this relationship resulted in a non-linear progression, wherein 90% accuracy (within 3 m/s) was achieved when 3 or more target vehicles were detected (see, FIG. 5). Finally, it is further appreciated that including a minimum engaged target threshold reduces unnecessary probe vehicle-to-center communications during open traffic flow conditions, which in turn significantly reduces the overall cost of the system 10.

Alternatively, or in addition to the minimum target threshold, discrepancy in target vehicle detection may be accommodated by attributing a weighted factor to each probed value based on the value of n. Thus, as shown in FIG. 1, where one probe vehicle 12 engages more target vehicles within its zone 22, that probed value will be given greater consideration in determining the average link speed. For example, the controller 36 may be further configured to multiply the probed value by n for a given probe vehicle 12.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. A traffic information system adapted for use by a mobile probe device spaced from a plurality of remotely traveling vehicles, and for updating at least one traffic condition and transmitting the traffic condition to at least one receiving entity, said system comprising:

a traffic information center configured to store a first value of the traffic condition; and at least one mobile probe device communicatively coupled to the center, including at least one exterior sensor configured to concurrently detect remote vehicle conditions for each of said plurality of remotely traveling vehicles including the current time, location, speed, and heading of each of said plurality of remote vehicles, configured to determine at the device a probed value of the traffic condition based in part on the detected remote vehicle conditions, and transmit the probed value to the center, wherein the probed value is based on the average speed of remote vehicles having generally congruent headings;

said center being communicatively coupled to said at least one probe device and said at least one receiving entity, and further configured to modify the first value of the traffic condition upon receipt of the probed value from said at least one probe device, and transmit the modified first value to said at least one receiving entity.

2. The system as claimed in claim 1, wherein said probe device is a probe vehicle, and the center transmits the modified first value to a plurality of receiving vehicles, which include said at least one probe vehicle.

3. The system as claimed in claim 2, wherein said at least one probe vehicle is configured to determine a corresponding probe vehicle condition, detect the remote vehicle conditions relative to the corresponding probe vehicle condition, and compute corresponding absolute remote vehicle conditions therefrom.

4. The system as claimed in claim 1, wherein each of a plurality of probe devices determines a separate probed value of the condition, and transmits the probed value to the center, and the modified value is cooperatively determined by the plurality of probed values received.

5. The system as claimed in claim 1, wherein the probe device is further configured to consider the remote vehicle condition only when the remote vehicle condition exceeds a predetermined remote vehicle condition threshold.

6. The system as claimed in claim 1, wherein said probe device is configured to segregate the remote traveling vehicles into pre-defined lanes of traffic, and determine a lane-specific average speed for each lane.

7. The system as claimed in claim 1, said at least one sensor utilizing a mode of detection selected from the group consisting essentially of radar, sonar, lidar, video imaging, and ultrasonic sensing.

8. The system as claimed in claim 7, wherein said probe device includes a plurality of short, medium, and long range exterior sensors.

9. The system as claimed in claim 1, wherein the probe device and receiving vehicles are communicatively coupled to the center by cellular communication.

10. The system as claimed in claim 1, wherein the transmission of the modified value is event-triggered.

11. The system as claimed in claim 1, wherein said probed and modified values of the condition are transmitted periodically.

12. The system as claimed in claim 1, wherein each of said at least one exterior sensor is communicatively coupled to a data processor.

13. The system as claimed in claim 12, wherein the remote vehicle conditions include the vehicle range relative to the exterior sensor, and the range rate over a given period.

14. The system as claimed in claim 12, wherein the remote vehicle conditions include the azimuth angle of the remote vehicle relative to the measuring sensor, and the azimuth angle rate based in part on the azimuth angle.

15. The system as claimed in claim 12, wherein said at least one probe device further includes a map database, and the remote vehicle conditions include the speed of the remote vehicle, and the travel time to a point on the map database.

* * * * *